(12) United States Patent
Wada et al.

(10) Patent No.: US 7,114,813 B2
(45) Date of Patent: Oct. 3, 2006

(54) IMAGE PROCESSING SYSTEM, PROJECTOR, PROGRAM, INFORMATION STORAGE MEDIUM AND IMAGE PROCESSING METHOD

(75) Inventors: Osamu Wada, Ina (JP); Masanobu Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 63 days.

(21) Appl. No.: 10/798,336

(22) Filed: Mar. 12, 2004

(65) Prior Publication Data

US 2004/0227908 A1    Nov. 18, 2004

(30) Foreign Application Priority Data

May 2, 2003    (JP) .............................. 2003-126876

(51) Int. Cl.
*H04N 3/22* (2006.01)
*G03B 21/14* (2006.01)

(52) U.S. Cl. ............................ 353/70; 353/94; 348/745
(58) Field of Classification Search ................... 353/94, 353/69, 70, 29, 122; 348/744, 745, 839, 348/840
See application file for complete search history.

(56) References Cited

U.S. PATENT DOCUMENTS

| | | | |
|---|---|---|---|
| 6,222,593 B1 | 4/2001 | Higurashi et al. | 348/745 |
| 6,456,339 B1 | 9/2002 | Surati et al. | 348/745 |
| 6,480,175 B1 * | 11/2002 | Schneider | 345/32 |
| 6,558,006 B1 * | 5/2003 | Ioka | 353/94 |
| 6,561,651 B1 * | 5/2003 | Kubota et al. | 353/30 |
| 6,814,448 B1 * | 11/2004 | Ioka | 353/69 |

FOREIGN PATENT DOCUMENTS

| | | |
|---|---|---|
| EP | 0 498 659 A2 | 8/1992 |
| EP | 0 543 332 A2 | 5/1993 |
| EP | 1 126 703 A2 | 8/2001 |
| JP | A 8-168039 | 6/1996 |
| JP | A 09-326981 | 12/1997 |

* cited by examiner

*Primary Examiner*—W. B. Perkey
*Assistant Examiner*—Andrew Sever
(74) *Attorney, Agent, or Firm*—Oliff & Berridge, PLC

(57) ABSTRACT

To provide an image processing system and the like which can correct image distortions and provide properly overlapped images when a plurality of projectors are used to project overlapped images, a projector includes: an image projection section projecting an image based on image signals to display the image in a manner to overlap another image projected from another projector at a projection target area; sensing section sensing an image and generating sensing information; overlap-area detecting section detecting projection areas for the projection target area, and detecting an overlap area at which the projection areas overlap, based on the sensing information; correction information generating section generating correction information indicating information for positions of the projection areas and a position of the overlap area; and projection area correction section correcting image signals, based on the correction information, to project an image onto a region corresponding to the overlap area.

16 Claims, 8 Drawing Sheets

FIG. 8

| H. | V | A' | | B' | | C' | | D' | |
|---|---|---|---|---|---|---|---|---|---|
| | | x | y | x | y | x | y | x | y |
| 0.50 | 0.50 | 0 | 0 | 0 | 479 | 639 | 479 | 639 | 0 |
| 0.55 | 0.50 | 0 | 0 | 0 | 479 | 634 | 474 | 634 | 5 |
| 0.60 | 0.50 | 0 | 0 | 0 | 479 | 629 | 469 | 629 | 10 |
| 0.65 | 0.50 | 0 | 0 | 0 | 479 | 624 | 464 | 624 | 15 |
| ⋮ | ⋮ | ⋮ | ⋮ | ⋮ | ⋮ | ⋮ | ⋮ | ⋮ | ⋮ |

IMAGE PROCESSING SYSTEM, PROJECTOR, PROGRAM, INFORMATION STORAGE MEDIUM AND IMAGE PROCESSING METHOD

Japanese Patent Application No. 2003-126876, filed on May 2, 2003, is hereby incorporated by reference in its entirety.

BACKGROUND OF THE INVENTION

The present invention relates to an image processing system, projector, program, information storage medium and image processing method which can correct image signals so that images projected by a plurality of image projection means are overlapped at a projection target area.

To secure the brightness of an image and to improve the dynamic range and color in the image, there has been realized an image display system comprising a plurality of projectors for projecting images so that they could be overlapped one another at a projection target area such as a screen. Such a projection of images is also called "stack projection".

In such an image display, however, the projection angles of the projectors are different from one another and consequently a distortion will occur in an image consisting of the projected and overlapped images. If a single projector is used to project an image and even when a distortion occurs therein, it is only required to regulate the distortion. If a plurality of projectors are used, however, it is required to regulate the projected mages to their proper display positions in addition to the regulation of the image distortions.

For such a reason, technical knowledge and great labor are required to perform the stack projection.

To facilitate the alignment in such overlapped images, for example, Japanese Patent Application Laid-Open No. 8-168039 has proposed a projection type display system which is operative to synthesize inspection for inspection patterns and video signals or to intermittently generate inspection signals, to project an image onto a screen, to detect the position of an inspection pattern image in the image projected onto the screen, to control the projecting position so that there is no misalignment.

In Japanese Patent Application Laid-Open No. 8-168039, however, it is presumed that a projected image is of rectangular shape. The projection type display system merely changes an optical projection axis in a hardware manner by detecting the position of the inspection pattern image and determining the amount of misalignment.

For such a reason, it is difficult that the technique of Japanese Patent Application Laid-Open No. 8-168039 causes the projection type display system to properly align the image positions under such a condition that a distortion of an image occurs as when a plurality of projectors are used or when a projector is not opposed directly to a screen.

In addition, Japanese Patent Application Laid-Open No. 8-168039 does not describe at all the fact that the projection type display system will change the color of a composite image by superimposing images.

BRIEF SUMMARY OF THE INVENTION

The present invention is made in view of the above-mentioned problem and its object is to provide an image processing system, projector, program, information storage medium and image processing method which can use a plurality of image projection means so that a plurality of images will properly be overlapped on one another by correcting distortions of the projected images.

An image processing system according to one aspect of the present invention includes:

a plurality of image projection means for projecting images based on image signals so that the images projected by the plurality of image projection means are displayed in a manner to overlap one another on a projection target area, the image projection means being disposed at different positions;

sensing means for sensing a predetermined image projected by each of the plurality of image projection means and generating sensing information;

overlap-area detecting means for detecting projection areas, each of the projection areas indicating a region in which the predetermined image is displayed in an sensing region of the sensing means and for detecting an overlap area at which the projection areas overlap one another, based on the sensing information;

correction information generating means for generating correction information which indicates information for positions of the projection areas and a position of the overlap area; and projection area correction means for correcting image signals inputted into the plurality of image projection means, based on the correction information, so that an image is projected onto a region in the projection target area corresponding to the overlap area.

A projector according to another aspect of the present invention includes:

image projection means for projecting an image based on image signals to display the image in a manner to overlap another image projected from another projector at a projection target area, the image projection means being disposed at a different position from a position in which the other projector is disposed;

sensing means for sensing a predetermined image projected onto the projection target area and generating sensing information;

overlap-area detecting means for detecting projection areas, each of the projection areas indicating a region in which the predetermined image is displayed in an sensing region of the sensing means and for detecting an overlap area at which the projection areas for the projector and the other projector overlap, based on the sensing information;

correction information generating means for generating correction information which indicates information for positions of the projection areas and a position of the overlap area; and projection area correction means for correcting image signals, based on the correction information, to project an image onto a region in the projection target area corresponding to the overlap area.

A projector according to a further aspect of the present invention includes:

image projection means for projecting an image based on image signals to display the image in a manner to overlap another image projected from another projector at a projection target area, the image projection means being disposed at a different position from a position in which the other projector is disposed;

sensing means for sensing a predetermined image projected onto the projection target area and generating sensing information;

overlap-area detecting means for detecting projection areas, each of the projection areas indicating a region in which the predetermined image is displayed in an sensing region of the sensing means and for detecting an overlap area at which the projection areas for the projector and the other projector overlap, based on the sensing information;

correction information generating means for generating correction information which indicates information for positions of the projection areas for the projector and the other projector and a position of the overlap area;

projection area correction means for correcting image signals, based on the correction information, to project an image onto a region in the projection target area corresponding to the overlap area; and communication means for transmitting the correction information for the other projector to the other projector.

A program according to a still further aspect of the present invention is a computer-readable program for causing a computer to function as:

image projection means for projecting an image based on image signals to display the image in a manner to overlap another image projected from another projector at a projection target area, the image projection means being disposed at a different position from a position in which the other projector is disposed;

sensing means for sensing a predetermined image and generating sensing information;

overlap-area detecting means for detecting projection areas, each of the projection areas indicating a region in which the predetermined image is displayed in an sensing region of the sensing means and for detecting an overlap area at which the projection areas for the projector and the other projector overlap, based on the sensing information;

correction information generating means for generating correction information which indicates information for positions of the projection areas and a position of the overlap area; and projection area correction means for correcting image signals, based on the correction information, to project an image onto a region in the projection target area corresponding to the overlap area.

A program according to an even further aspect of the present invention is a computer-readable program for causing a computer to function as:

image projection means for projecting an image based on image signals to display the image in a manner to overlap another image projected from another projector at a projection target area, the image projection means being disposed at a different position from a position in which the other projector is disposed;

sensing means for sensing a predetermined image and generating sensing information;

overlap-area detecting means for detecting projection areas, each of the projection areas indicating a region in which the predetermined image is displayed in an sensing region of the sensing means and for detecting an overlap area at which the projection areas for the projector and the other projector overlap, based on the sensing information;

correction information generating means for generating correction information which indicates information for positions of the projection areas and a position of the overlap area;

projection area correction means for correcting image signals, based on the correction information, to project an image onto a region in the projection target area corresponding to the overlap area; and communication means for transmitting the correction information for the other projector to the other projector.

An information storage medium according to a yet further aspect of the present invention stores a computer-readable program for causing a computer to function as:

image projection means for projecting an image based on image signals to display the image in a manner to overlap another image projected from another projector at a projection target area, the image projection means being disposed at a different position from a position in which the other projector is disposed;

sensing means for sensing a predetermined image and generating sensing information;

overlap-area detecting means for detecting projection areas, each of the projection areas indicating a region in which the predetermined image is displayed in an sensing region of the sensing means and for detecting an overlap area at which the projection areas for the projector and the other projector overlap, based on the sensing information;

correction information generating means for generating correction information which indicates information for positions of the projection areas and a position of the overlap area; and projection area correction means for correcting image signals, based on the correction information, to project an image onto a region in the projection target area corresponding to the overlap area.

An information storage medium according to an even more further aspect of the present invention stores a computer-readable program for causing a computer to function as:

image projection means for projecting an image based on image signals to display the image in a manner to overlap another image projected from another projector at a projection target area, the image projection means being disposed at a different position from a position in which the other projector is disposed;

sensing means for sensing a predetermined image and generating sensing information;

overlap-area detecting means for detecting projection areas, each of the projection areas indicating a region in which the predetermined image is displayed in an sensing region of the sensing means and for detecting an overlap area at which the projection areas for the projector and the other projector overlap, based on the sensing information;

correction information generating means for generating correction information which indicates information for positions of the projection areas and a position of the overlap area;

projection area correction means for correcting image signals, based on the correction information, to project an image onto a region in the projection target area corresponding to the overlap area; and communication means for transmitting the correction information for the other projector to the other projector.

An image processing method according to a yet more further aspect of the present invention includes:

projecting projection area calibration images from the projectors onto a projection target area at different points of time using the projectors, at a time of calibration;

sensing the projection area calibration images projected by the projectors and generating sensing information;

converting sensing information in sensing coordinates into sensing information in projection target area coordinates, based on the sensing information that has been generated;

detecting projection areas based on the sensing information that has been converted and detecting an overlap area in which the projection areas overlap one another, each of the projection areas indicating a region in the sensing area in which each of the projection area calibration images is projected;

generating correction information which indicates information for positions of the projection areas and a position of the overlap area;

correcting image signals inputted into the projectors based on the correction information, so that an image is projected onto a region in the projection target area corresponding to the overlap area; and projecting images by the projectors based on the image signals that have been corrected.

In accordance with the present invention, the image processing system and the like can use a plurality of image projection means such as projectors to project images so that the distortions of the images are corrected and the images are properly overlapped one another, by detecting an image overlap area to generate correction information and correcting image signals based on the correction information.

With the above image processing system, the plurality of image projection means may project projection area calibration images at different points of time, and the overlap-area detecting means may determine a peak position that is a brightest position in each of the projection area calibration images that have been sensed, based on the sensing information for the projection area calibration images, and detects the projection areas based on the peak position.

In any of the above projectors, the image projection means may project projection area calibration images at a point of time different form a point of time for another projector, and the overlap-area detecting means may determine a peak position that is a brightest position in each of the projection area calibration images projected by the projector and the other projector, based on the sensing information for the projection area calibration images, and detects the projection areas based on the peak position.

The above image processing method may include:

determining a peak position that is a brightest position in each of the projection area calibration images that have been sensed, based on the sensing information for the projection area calibration images, and converting sensing information in sensing coordinates into sensing information in projection target area coordinates, based on the peak position.

Thus, the image processing system and the like can more accurately detect the image distortion by reducing the influence of color in the projection target area since they can determine the image distortion based on the distribution of brightness in an image rather than the hue thereof.

With the above image processing system, projectors, programs and information storage mediums, the overlap-area detecting means may detect the overlap area by adding a brightness index value of a pixel or a pixel block in each of the projection areas that have been detected.

The above image processing method may include: detecting the overlap area by adding a brightness index value of a pixel or a pixel block in each of the projection areas that have been detected.

Thus, the image processing system and the like can adequately detect the overlap area by determining a differential brightness index value between projection area calibration images even if the projection area calibration images are projected and sensed at different points of time.

The brightness index value used herein may include a luminance value (including a computationally deformed luminance value), an illuminance value, a lightness value and so on.

With the above image processing system, projectors, programs and information storage mediums, the overlap-area detecting means may detect a rectangular overlap area which is the overlap area, aspect ratio of which has been adjusted, and the correction information generating means may generate, as the correction information, one of information that indicates positions of four corners in the rectangular overlap area and positions of four corners in each of the projection areas, information that indicates the positions of the four corners in the rectangular overlap area, and information that indicates differential values between the positions of the four corners in the rectangular overlap area and the positions of the four corners in each of the projection areas.

The above image processing method may include:

detecting a rectangular overlap area which is the overlap area, aspect ratio of which has been adjusted, and generating, as the correction information, one of information that indicates positions of four corners in the rectangular overlap area and positions of four corners in each of the projection areas, information that indicates the positions of the four corners in the rectangular overlap area, and information that indicates differential values between the positions of the four corners in the rectangular overlap area and the positions of the four corners in each of the projection areas.

Thus, the image processing system and the like can correct image signals so that the projection area becomes the overlap area, by determining a differential value between each of the four corners in the rectangular projection area and each of the four corners of the rectangular overlap area.

The above image processing system may further include a color reproduction means for correcting color and brightness in an image based on color reproduction information, in order to reproduce color and brightness of an target image, the plurality of image projection means may project color reproducing calibration images for correcting the color and brightness of an image in a manner to overlap one another onto the region in the projection target area corresponding to the overlap area, on condition that the image signals are corrected by the projection area correction means and an image is projectable onto the region in the projection target area corresponding to the overlap area, the sensing means may sense the color reproducing calibration images that have been projected onto the region in the projection target area corresponding to the overlap area, the correction information generating means may generate the color reproduction information based on the sensing information for the color reproducing calibration images, and the color reproduction means may correct the image signals based on the color reproduction information.

Any of the above projectors may further include a color reproduction means for correcting color and brightness in an image based on color reproduction information, in order to reproduce color and brightness of an target image, the image projection means may project color reproducing calibration images for correcting the color and brightness of an image in a manner to overlap one another onto the region in the projection target area corresponding to the overlap area, on condition that the image signals are corrected by the projection area correction means and an image is projectable onto the region in the projection target area corresponding to the overlap area, the sensing means may sense the color reproducing calibration images that have been projected onto the region in the projection target area corresponding to the overlap area, the correction information generating means may generate the color reproduction information based on the sensing information for the color reproducing calibration images, and the color reproduction means may correct the image signals based on the color reproduction information.

Any of the above the programs and information storage mediums may cause a computer to function as a color reproduction means for correcting color and brightness in an image based on color reproduction information, in order to reproduce color and brightness of an target image, the plurality of image projection means may project color reproducing calibration images for correcting the color and brightness of an image in a manner to overlap one another onto the region in the projection target area corresponding to the overlap area, on condition that the image signals are corrected by the projection area correction means and an image is projectable onto the region in the projection target area corresponding to the overlap area, the sensing means may sense the color reproducing calibration images that have been projected onto the region in the projection target area corresponding to the overlap area, the correction information generating means may generate the color reproduction information based on the sensing information for the color reproducing calibration images, and the color reproduction means may correct the image signals based on the color reproduction information.

The above image processing method may include:

projecting color reproducing calibration images for correcting the color and brightness of an image in a manner to overlap one another onto the region in the projection target area corresponding to the overlap area, on condition that the image signals are corrected and an image is projectable onto the region in the projection target area corresponding to the overlap area;

sensing the color reproducing calibration images that have been projected onto the region in the projection target area corresponding to the overlap area;

generating the color reproduction information based on the sensing information for the color reproducing calibration images; and correcting the image signals based on the color reproduction information.

Thus, the image processing system and the like can properly correct the color and brightness of the image by sensing the overlapped images on the region corresponding to the overlap area and correcting the color and brightness of those images.

BRIEF DESCRIPTION OF THE SEVERAL VIEWS OF THE DRAWING

FIG. 3A is a schematic view of an image projected by a left-side projector while

FIG. 8 schematically shows the structure of converting data according to one example of an embodiment of the present invention.

DETAILED DESCRIPTION OF THE EMBODIMENT

Figure 1:
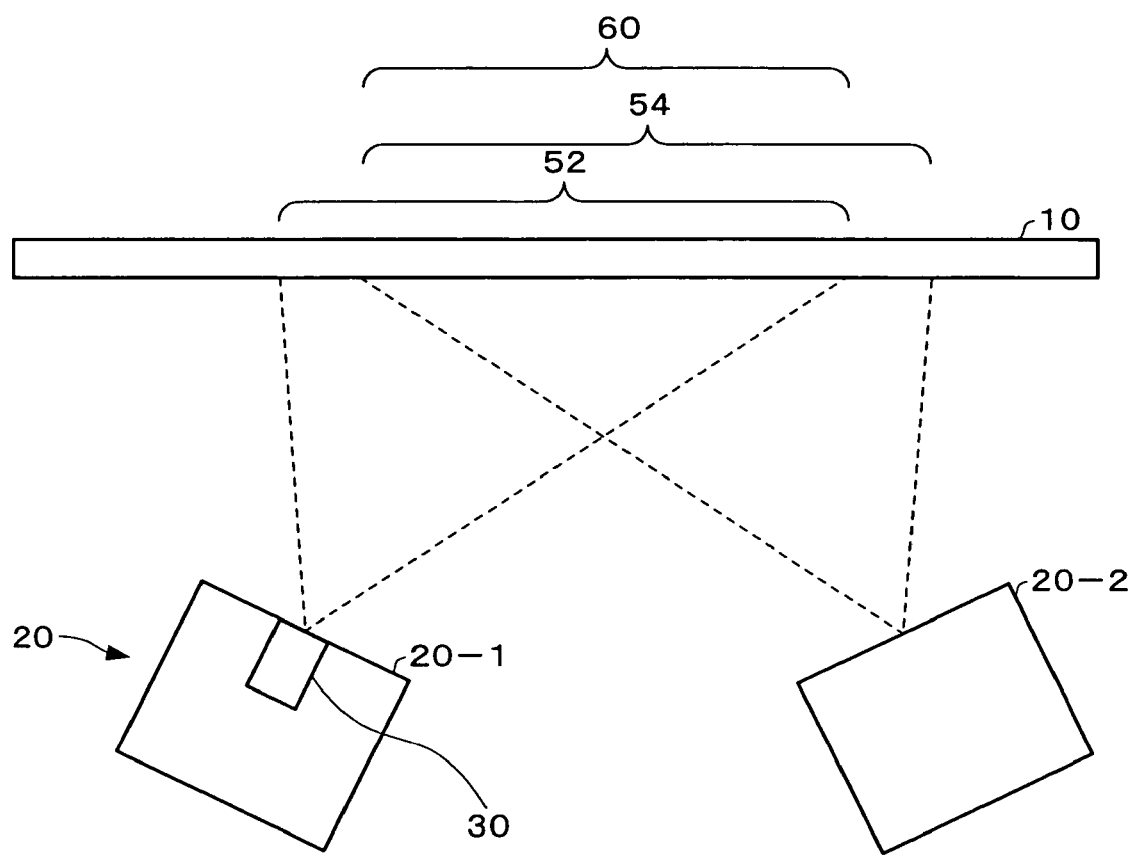
FIG. 1 schematically shows a state when an image is projected.

The present invention will now be described in connection with a plurality of projectors for projecting images overlapped on one another onto a projection target area and with reference to the drawing. By the way, an embodiment shown in the following is not intended to limit the subject matter of the invention as described in the accompanying claims. Moreover, all the components shown in such an embodiment is not necessarily essential for practicing the invention defined by the accompanying claims.

Overall System

Figure 2A:
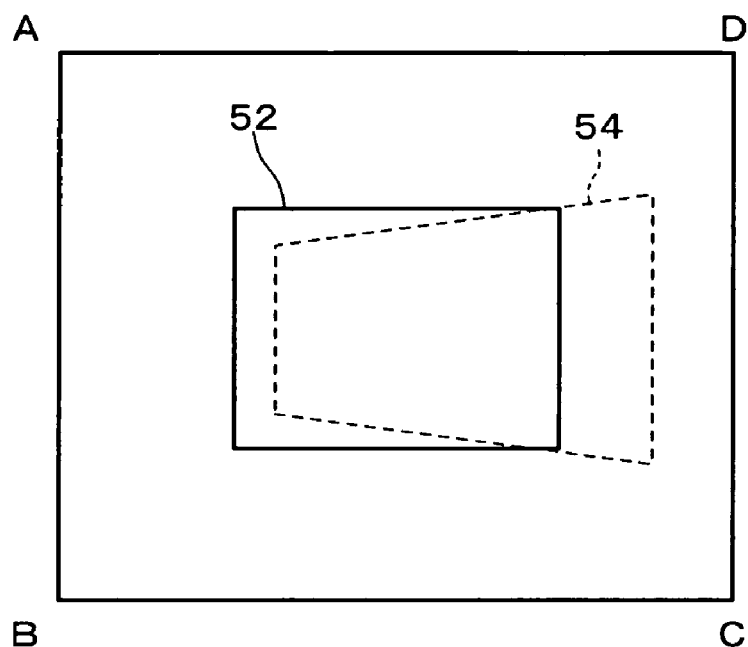
FIG. 2A schematically shows a sensed image at sensing coordinates while FIG. 2B schematically shows a sensed image at projection target area coordinates.
Figure 2B:
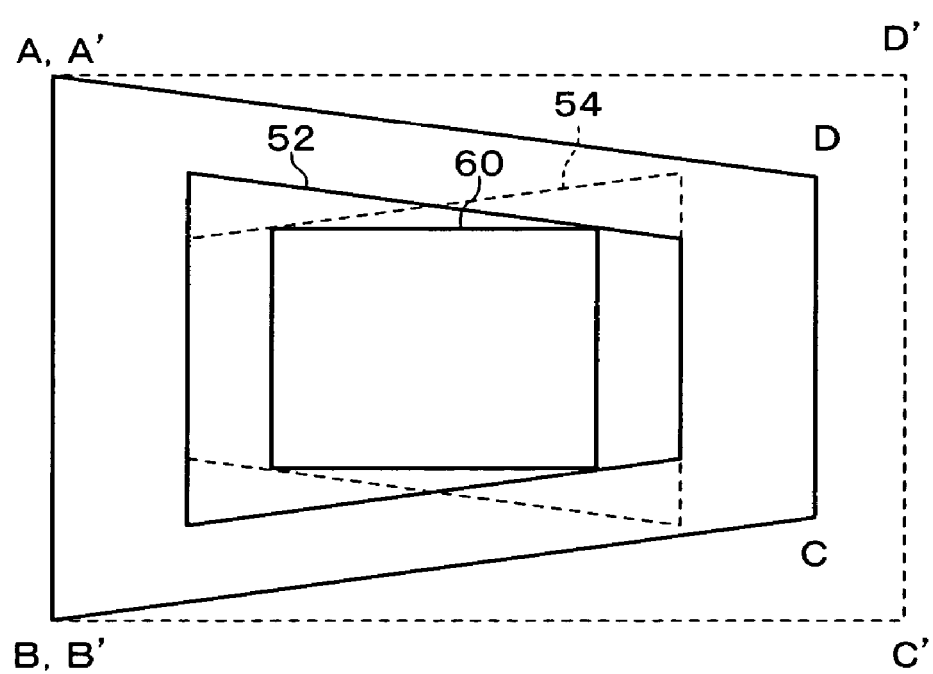
Figure 3A:
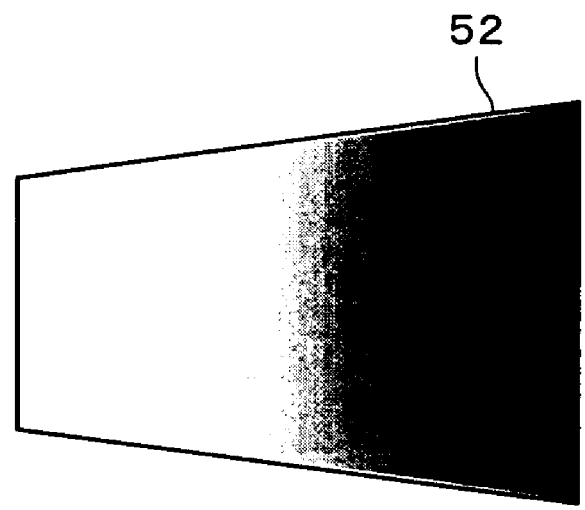
Figure 3B:
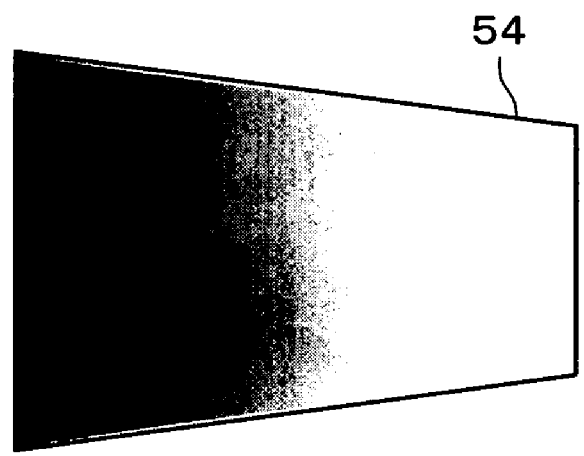
FIG. 3B is a schematic view of an image projected by a right-side projector.

FIG. 1 schematically shows a state when an image is projected. FIG. 2A schematically shows images 52 and 54 in an sensing region coordinate system while FIG. 2B schematically shows images 52 and 54 in a projection target area coordinate system. FIG. 3A is a schematic view of the image 52 projected by a left-side projector 20-1 while FIG. 3B is a schematic view of the image 54 projected by a right-side projector 20-2.

The projector 20-1 of this embodiment cooperates with the other projector 20-2 to project overlapped images onto a screen 10 which is a kind of projection target area. For such a reason, the projector 20-1 is disposed on the left side as viewed toward the screen 10 while the projector 20-2 is disposed on the right side.

The projector 20-1 projects an image to the screen 10 to display the image 52 on the screen 10. The projector 20-2 projects an image onto the screen 10 to display the image 54 on the screen 10 overlapping a part of the image 52. The size of the images 52 and 54 may be different from each other.

In such a manner, the brightness of an image can sufficiently be ensured by displaying the overlapped images 52 and 54 projected from the projectors 20-1 and 20-2.

Since the projections of the projectors 20-1 and 20-2 are oblique relative to the screen 10 as shown in FIG. 1, the images 52 and 54 will be distorted into keystone forms as viewed from the front of the screen 10, as shown in FIG. 2B.

To correct such a keystone distortion, the projector 20-1 is equipped with a sensor 30 as shown in FIG. 1. The sensor 30 senses regions on the screen 10 that include the respective images 52 and 54. The sensor 30 senses regions on the screen 10 that include the respective images 52 and 54.

The sensor 30 generates sensing information by sensing the regions on the screen 10 that include the images 52 and 54, respectively. The projector 20-1 can determine the images 52 and 54 within a sensing region ABCD in an sensing region coordinate system shown in FIG. 2A, based on the sensing information.

The projector 20-1 also converts the sensing information generated by the sensor 30 into sensing information in a projection target area coordinate system shown in FIG. 2B. Thus, the projector 20-1 can determine the images 52 and 54 within a projection target area A'B'C'D' in the projection target area coordinate system.

As can be seen from the comparison between FIGS. 2B and 2A, the image 52 does not look to be distorted when it is viewed from the sensor 30 mounted on the projector 20-1. It is thus difficult that the sensor 30 determines the distortion of the image 52 through the conventional techniques when it is viewed from the front of the screen 10.

The projector 20-1 can adequately determine the distortion of the image 52 by converting the coordinates of the image 52 in the sensing region coordinates system into the coordinates of the image 52 in the image projecting region coordinate system which is viewed from the front of the screen 10.

The projector 20-1 can also determine the luminance distributions in the images 52 and 54, based on the sensing information for the images 52 and 54 in the projection target area coordinate system. For example, the image 52 in the projection target area coordinate system has its luminance distribution that is brighter on the left side and darker on the right side, as shown in FIG. 3A while the image 54 in the projection target area coordinate system has its luminance distribution that is brighter on the right side and darker on the left side, as shown in FIG. 3B. This is because in the arrangement shown in FIG. 1, the left-side portion of the 52 is nearer the light source of the projector 20-1 while the right-side portion of the image 54 is nearer the light source of the projector 20-2.

In this embodiment, the projector 20 determines and corrects the distortions of the images 52 and 54 by determining such luminance distributions.

In this embodiment, the projector 20 also adjusts the positions and sizes of the displayed images such that they will be displayed on an overlap area 60 having a predetermined aspect ratio among temporary overlap areas on which the regions (projection areas) of the images 52 and 54 in the sensing region overlap.

By performing such an adjustment, the projector 20 can eliminate the image distortions and sufficiently ensure the brightness in the images.

Description of Block Diagrams

Functional blocks of the projector 20 having such a function will be described below.

Figure 4:
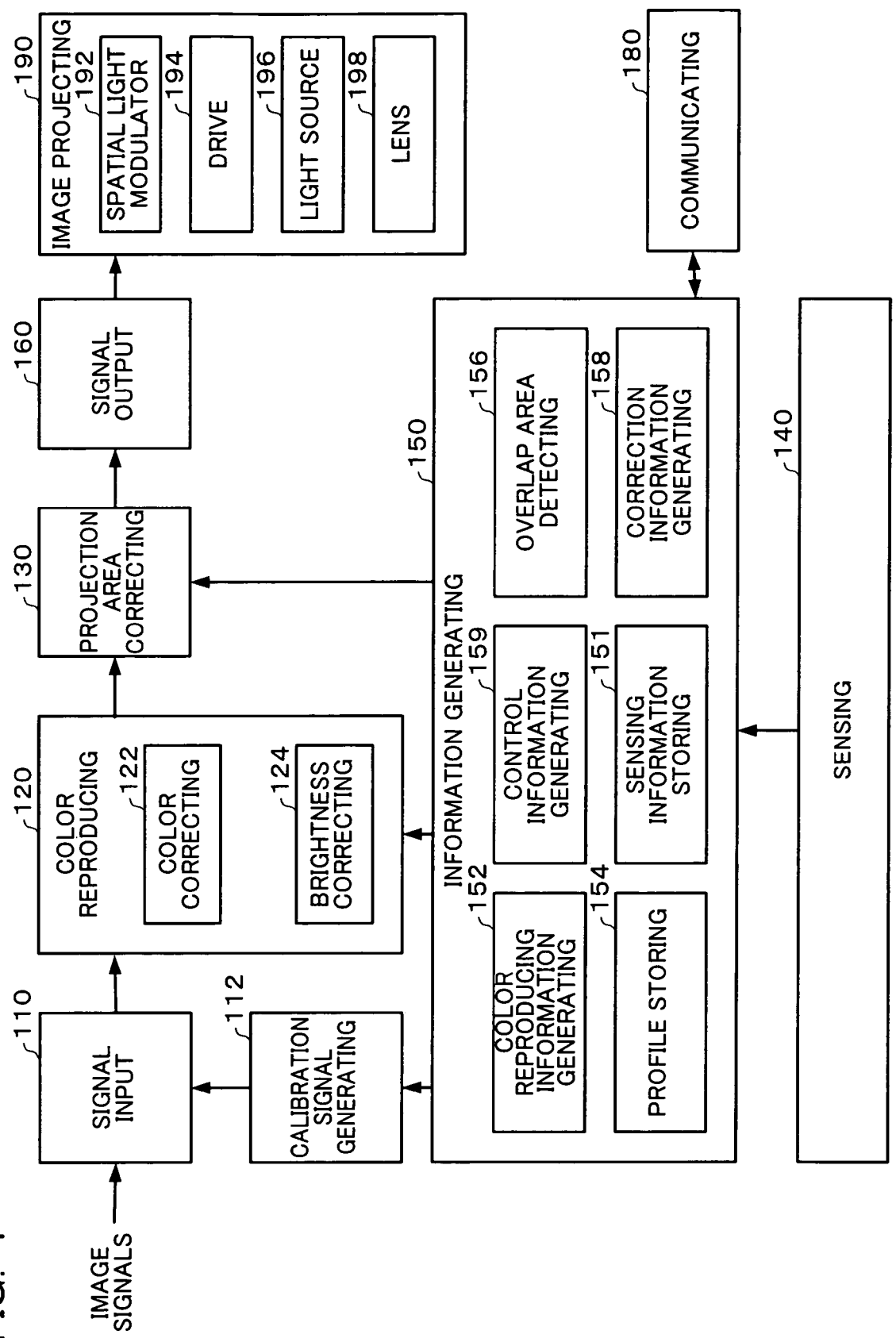
FIG. 4 is a functional block diagram of a projector according to one example of an embodiment of the present invention.

FIG. 4 is a functional block diagram of a projector 20 according to one example of an embodiment of the present invention.

The projector 20 comprises a signal input section 110 for inputting image signals, a color reproducing section 120 for correcting the image signals so that the color of an image accommodating to a target color can be reproduced, a projection area correcting section 130 for correcting image signals from the color reproducing section 120 so that images will be displayed on an overlap area 60, a signal output section 160 for outputting the corrected image signals, and an image projecting section 190 for projecting images based on the image signals.

The projector 20 also comprises a calibration signal generating section 112 for generating calibration signals used to display a projection area calibration image and a color reproducing calibration image, an sensing section 140 for sensing a region on the screen 10 that includes projected images, an information generating section 150 for generating correction information used in the color reproducing section 120 and projection area correcting section 130, based on the sensing information, and a communication section 180 for transmitting and receiving correction information and the like to and from the other projectors 20.

The color reproducing section 120 comprises a color correcting section 122 for correcting the image signals to provide an image color accommodating to a target color, and a brightness correcting section 124 for correcting the image signals to provide an image brightness accommodating to the target color.

The information generating section 150 comprises a profile storage section 154 for storing a target color profile, a hardware profile for the projectors 20 and so on, a color reproduction information generating section 152 for generating color reproduction information based on the target color profile and the hardware profile for the projectors 20, an overlap area detecting section 156 for detecting the projection area and overlap area 60 in the sensing region, and a correction information generating section 158 for generating correction information indicative of information for the respective positions of the overlap area 60 and projection area.

The information generating section 150 also comprises an sensing information storage section 151, and a control information section 159 for generating control information used to control the other projector 20.

The image projecting section 190 comprises a spatial light modulator 192, a drive section 194 for driving the spatial light modulator 192, a light source 196, and a lens 198.

The drive section 194 drives the spatial light modulator 192 based on the image signals from the signal output section 160. The image projecting section 190 projects the light from the light source 196 through the spatial light modulator 192 and lens 198.

In accordance with this embodiment, only the projector 20-1 is operative to sense the images, generate the correction information and adjust the color and brightness in the images. It is thus unnecessary for the projector 20-2 to include the sensing section 140, sensing information storage section 151, color reproduction information generating section 152 and correction information generating section 158.

Hardware for causing a computer to function as the sections of the projector 20 may be implemented by the following equipment.

Figure 5:
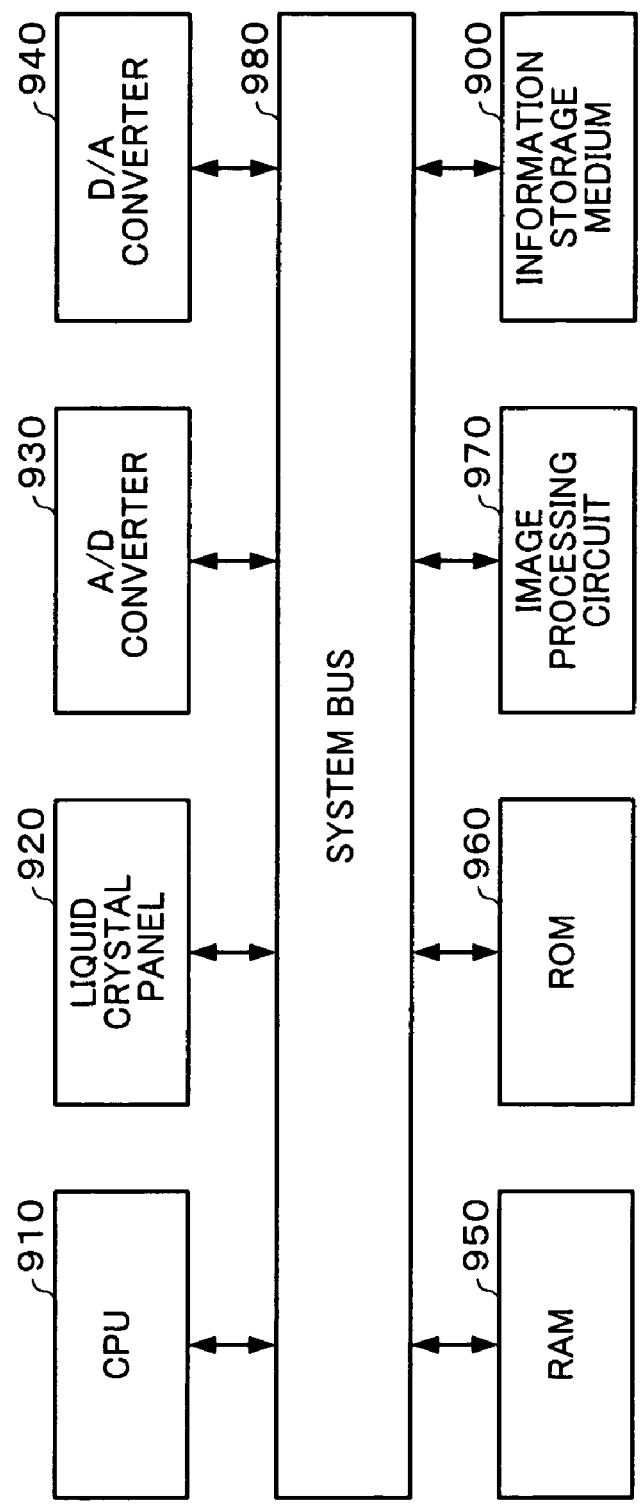
FIG. 5 is a hardware block diagram illustrating a projector according to one example of an embodiment of the present invention.

FIG. 5 is a hardware block diagram illustrating a projector 20 according to one example of an embodiment of the present invention.

The signal input unit 110 may be implemented, for example, by an A/D converter 930 or the like; the color reproducing section 120 and the projection area correcting section 130 may be implemented, for example, by an image processing circuit 970, RAM 950, CPU 910 or the like; the signal output section 160 may be implemented, for example, by a D/A converter 940 or the like; the calibration signal generating section 112 and the information generating section 150 may be implemented, for example, by the image processing circuit 970, RAM 950 or the like; the sensing section 140 may be implemented, for example, by a CCD camera or the like; and the spatial light modulator 192 may be implemented, for example, by a liquid crystal panel 920, a ROM 960 for storing the liquid crystal light valve driver for driving the liquid crystal panel 920 or the like.

These units and sections are configured to mutually deliver the information therebetween through a system bus 980. The sensor 30 forms part of the sensing section 140.

The part or whole of each of these sections may be implemented in a hardware manner such as circuits or in a software manner such as drivers.

Furthermore, the functions of the projection area correcting section 130 and the like may be implemented into a computer by reading a program used to activate the computer out of an information storage medium 900.

Such an information storage medium 900 may be accomplished, for example, by CD-ROM, DVD-ROM, ROM, RAM, HDD or the like through either of the contact or non-contact type reading mode.

In addition, the aforementioned functions may be implemented into the computer by downloading a program for implementing the above functions into the computer or the like from a host device or the like through a transmission channel, in place of the information storage medium 900.

Image Processing

The flow of image processing using these sections will be described below.

Figure 6:
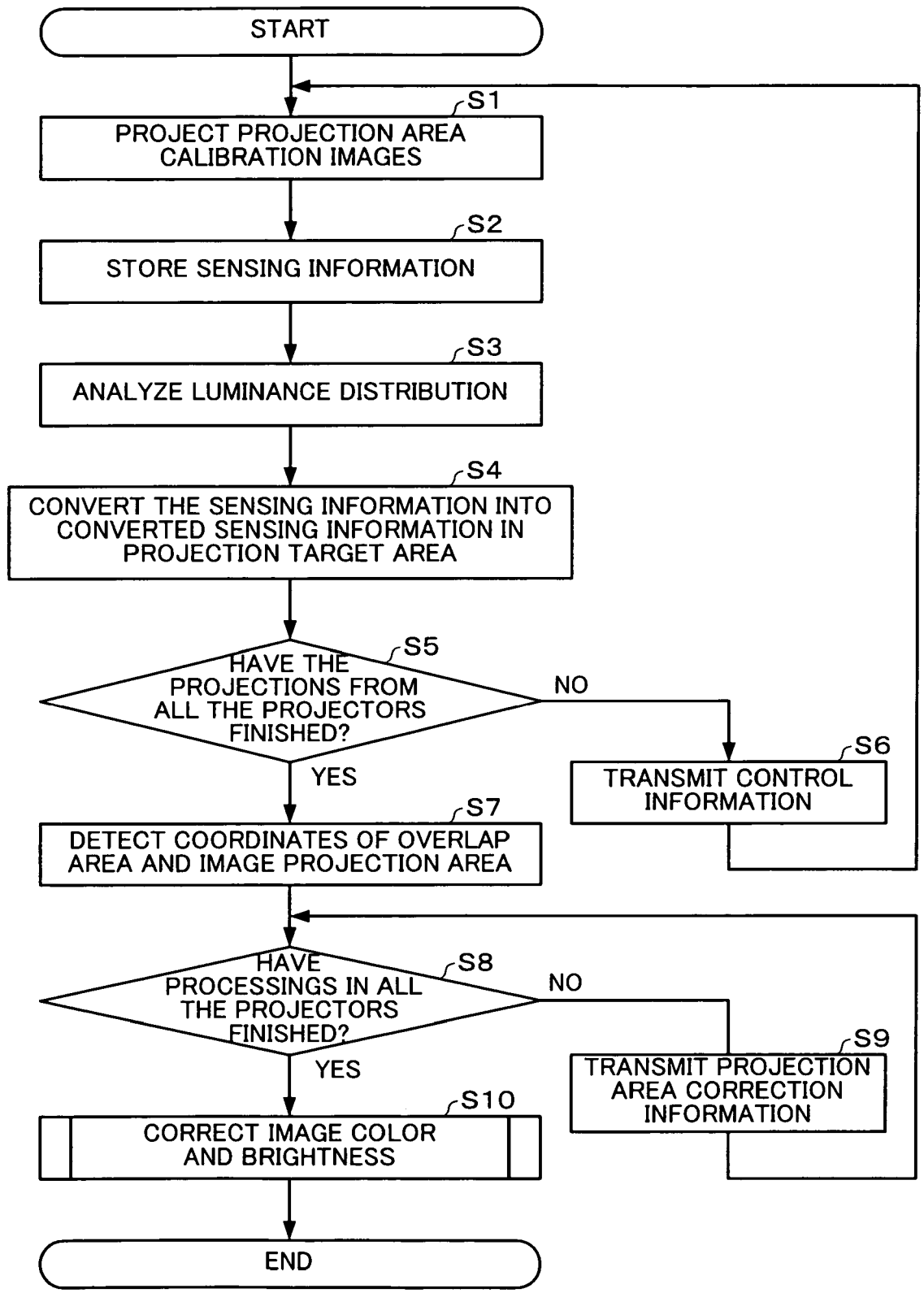
FIG. 6 is a flow chart illustrating a flow of image processing according to one example of an embodiment of the present invention.

FIG. 6 is a flow chart illustrating a flow of image processing according to one example of an embodiment of the present invention.

First of all, a user starts the projectors 20-1 and 20-2. The projector 20-1 projects a monochrome (e.g., white-colored) projection area calibration image (step S1). More particularly, the calibration signal generating section 112 generates image signals used to project the projection area calibration image, based on the control information from the control information generating section 159. The image projecting section 190 then projects the image based on the image signals corrected by the color reproducing section 120 and the projection area correcting section 130.

This projection area calibration image may be one of color reproducing calibration images described below.

The sensing section 140 of the projector 20-1 senses a region on the screen 10 that includes the projection area calibration image and then generates sensing information, and the sensing information storage section 151 stores the sensing information from the sensing section 140 (step S2).

The overlap area detecting element 156 then performs a luminance distribution analysis (step S3).

More particularly, the overlap area detecting element 156 detects the position of a pixel having the highest luminance value among luminance values of the all pixels included in the sensing information as a peak position. This technique of detecting the pixel position may be accomplished by detecting a portion near a pixel adjacent to another pixel in which the rate of change in the luminance value thereof becomes equal to one (1) as a peak position. Alternatively, it may detect a pixel having the highest luminance value in all pixels which have been stored in a memory, as a peak position.

For example, if the luminance value at the center of a sensed image is the highest, it will be judged that the projector 20 is positioned directly in the front of the screen 10. If the left-side portion of a sensed image has the highest luminance value, it will be judged that the projector 20 inclines leftward relative to the screen 10.

The overlap area detecting element 156 then converts the sensing information in the sensing region coordinate system into the converted sensing information in the projection target area coordinate system, based on the peak position and converting data, the converted sensing information being then stored in the sensing information storage section 151 (step S4).

FIG. 8 schematically shows the structure of converting data according to one example of an embodiment of the present invention.

In FIG. 8, for example, H may be a numeric value indicative of the horizontal position and have a central position of 0.5. Furthermore, V may be a numeric value indicative of the vertical position and have the center of 0.5.

In such a manner, if the peak position is varied, the respective coordinates of the projection target area A'B'C'D' in the projection target area coordinate system will be changed. Thus, the overlap area detecting element 156 can generate the converted sensing information depending on the degree of the change.

The control information generating section 159 then judges whether or not the projection of projection area calibration image in all the projectors 20 has been finished (step S5). If not so, control information is transmitted to the next projector 20-2 (step S6).

The projector 20-2 projects a projection area calibration image in a procedure similar to that of the projector 20-1.

The sensing section 140 senses the projection area calibration images; the sensing information storage section 151 stores the sensing information of the projection area calibration images; and the overlap area detecting element 156 causes the sensing information storage section 151 to store the converted sensing information provided by converting the sensing information into the projection target area coordinate system.

In such a manner, the sensing section 140 judges whether or not the projection, pickup and conversion of the projection area calibration images from all the projectors 20 have been finished (step S5). If so, the sensing process is finished.

The overlap area detecting section 156 then detects the coordinates of the images 52 and 54 in the projection target area coordinate system and the coordinates of the overlap area 60 at which the images 52 and 54 in the projection target area coordinate system are overlapped each other, based on the converted sensing information for each projector 20 stored in the sensing information storage section 151 (step S7).

More particularly, the overlap area detecting section 156 detects a temporary overlap area for the images 52 and 54, based on converted sensing information which has been converted to be able to handle in a coordinate system on the screen 10 (projection target area). The overlap area detecting section 156 detects the overlap area 60 within the temporary overlap area, whose position and size have been adjusted to ensure a desired aspect ratio (e.g., equal to 4:3, 16:9 or the like).

The technique of selecting the overlap area 60 from the temporary overlap area may be adapted to enlarge the region from the vertexes of that temporary overlap area or to enlarge the region from the center of that temporary overlap area.

The correction information generating section 158 then judges whether or not the region transmission process in all the projectors 20 has been finished (step S8). If not so, the correction information generating section 158 generates correction information indicative of the coordinates of the image 54 and overlap area 60. The communication section 180 transmits the correction information toward the projector 20-2 (step S9).

The projection area correcting section 130 of the projector 20-2 corrects image signals so that an image is projected onto a region on the screen 10 corresponding to the overlap area 60, based on the correction information. Moreover, the projection area correcting section 130 of the projector 20-1 corrects image signals so that an image is projected onto a region of the screen 10 corresponding to the overlap area 60, based on the correction information indicative of the coordinates of the image 52 and overlap area 60 which have been generated by the correction information generating section 158.

By the above-mentioned procedure, the projectors 20-1 and 20-2 can correct image signals so that the images will be projected onto the region on the screen 10 corresponding to the overlap area 60.

In such a manner, the projector 20-1 correct the color and brightness in the images to provide a color and brightness of a target image under such a condition that the projectors 20-1 and 20-2 can project images onto the overlap area 60 (step S11).

Figure 7:
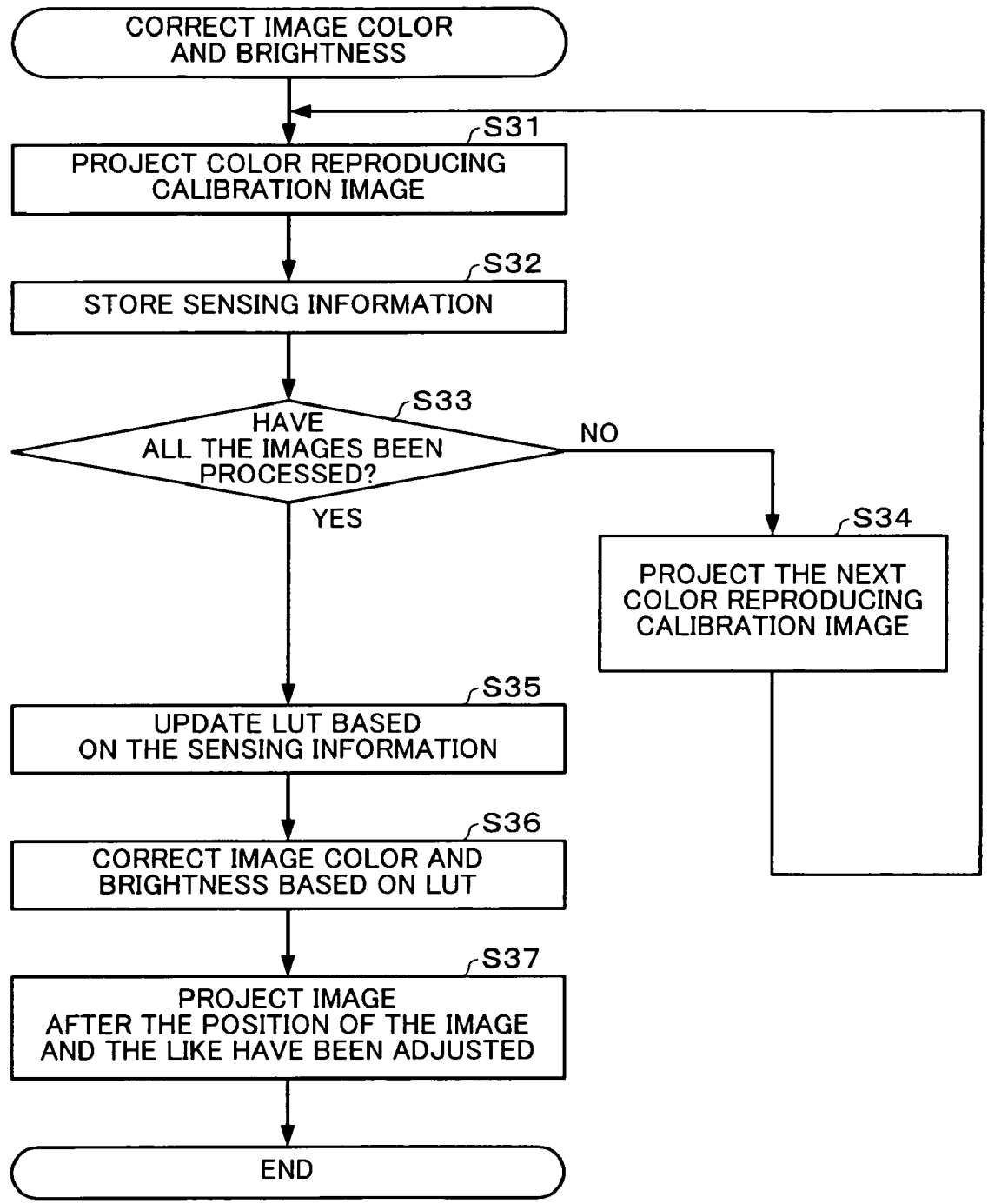
FIG. 7 is a flow chart illustrating a flow of process for correcting the color and brightness of an image according to one example of an embodiment of the present invention.

FIG. 7 is a flow chart illustrating a flow of process for correcting the color and brightness of an image according to one example of an embodiment of the present invention.

The control information generating section 159 transmits control information to the calibration signal generating section 112, to generate calibration signals for the first calibration image. The calibration signal generating sections 112 of the projectors 20-1 and 20-2 generate calibration signals for the first color reproducing calibration image, based on the control information. Herein, the color reproducing calibration image may be a monochrome red-, green-, blue- or white-colored image, for example.

The image projecting sections 190 of the projectors 20-1 and 20-2 then project the first color reproducing calibration images, based on the calibration signals (step S31).

Thus, the first color reproducing calibration images will be projected from the projectors 20-1 and 20-2 onto the overlap area 60 of the screen 10.

The sensor 30 then senses the screen 10 and the sensing information storage section 151 then stores the sensing information for the first color reproducing calibration images (step S32).

The control information generating section 159 judges whether or not the sensing information for all the color reproducing calibration images have been stored (step S33). If not so, the control information generating section 159 outputs a control information toward the calibration signal generating section 112 so that the next color reproducing calibration image will be projected (step S34).

In such a manner, if the sensing information for the four, first to fourth color reproducing calibration images (but, not limited to four colors) have been stored, the color reproduction information generating section 152 determines the amounts of correction for the color and brightness, based on the X-, Y- and Z-values of the sensing information and the target color profile and the hardware profile for the projectors 20 which are stored in the profile storage section 154. The X-, Y- and Z-values used herein are tristimulus values which are machinery independence colors based on the International Standard defined by the International Commission on Illumination (CIE).

The color correcting section 122 updates a 3D-LUT (or three-dimensional lookup table) which is a kind of data for color correction, based on correction information for a color generated by the color reproduction information generating section 152. The brightness correcting section 124 updates a ID-LUT (or one-dimensional lookup table) which is a kind of data for brightness correction, based on correction information for a brightness generated by the color reproduction information generating section 152 (step S35).

The color correcting section 122 then corrects the image signals based on the updated 3D-LUT and the brightness correcting section 124 corrects the image signals based on the updated 1D-LUT (step S36). Thus, the color and brightness of the image accommodates to the target color.

The projection area correcting section 130 corrects the image signals from the color reproducing section 120 so that an image will be projected on the region of the screen 10 corresponding to the overlap area 60. The signal output section 160 converts the image signals from the projection area correcting section 130 into analog signals which is in turn outputted toward the image projecting section 190.

The image projecting section 190 projects an image in which the position, distortion, color and brightness of the projected image have been corrected based on the image signals from the signal output section 160 (step S37).

By the above-mentioned procedure, the projectors 20-1 and 20-2 can display the images in which the positions, distortions, colors and brightnesses thereof have been corrected.

As described above, according to this embodiment, when images are projected and overlapped each other by a plurality of plural image projecting section 190, the projectors 20-1 and 20-2 can automatically correct the image distortions to provide the adequately overlapped images by detecting the image overlap area 60 to generate the correction information and correcting the image signals based on the correction information.

Even if a user does not have any technical knowledge, that user can easily and simply project the adequately overlapped images through such an automatic correction.

Even if the number of projectors 20 is increased to two or four depending on the size of the projection target area to which the projectors 20 are to be applied, these projectors 20 can effectively project overlapped images.

According to this embodiment, the projector 20 can determine the image distortion based on the distribution of brightness in an image rather than a hue of that image. Therefore, the projector 20 can reduce the influence of color on the screen 10 and more precisely detect the image distortion.

According to this embodiment, the projectors 20-1 and 20-2 can adequately detect the overlap area 60 by determining a difference between the luminance values, even if the projection area calibration images projected at different points of time are to be sensed.

According to this embodiment, the projectors 20-1 and 20-2 can correct the image signals so that the images 52 and 54 will be overlapped each other at the overlap area 60 by determining the coordinates of the four corners in the rectangular images 52 and 54, the coordinates of the four corners in the rectangular overlap area 60 and the differential values between these coordinates.

According to this embodiment, the projector 20 can further adequately correct the color and brightness of the integrated image by sensing an integrated image consisting of the overlapped images at the overlap area 60 and then correcting the color and brightness of the integrated image.

The projector 20-1 can properly correct the color and brightness of the integrated image under influence of the ambient lights such as illuminating and external lights, based on the sensing information from the sensor 30.

The optical axis of the lens 198 in the image projecting section 190 may be coincident with the optical axis of the sensor 30 since the projector 20 will not directly determine the shape of an image. Therefore, the sensor 30 may be integrated into the projector 20 (or the sensor 30 may be included in the projector 20).

Modifications

Although the preferred embodiment of the present invention has been described, the present invention is not limited to the aforementioned examples.

Although the embodiment has been described as to the correction information generating section 158 which generates information including the coordinate information for the four corners in the respective projection area and overlap area 60 as correction information, the information indicative of the differential values between the four-corner coordinates of the projection area and the four-corner coordinates of the overlap area 60 or only the four-corner coordinate information of the overlap area 60 may be generated if the projector 20-2 has determined the four-corner coordinates of the projection area without performing any zooming and any projection angle change. Even in such a manner, the projector 20-2 can adjust the position and size of the image 54.

It is not necessary that the projector 20 includes the communication section 180. For example, each of the projectors 20 may include the sensing section 140 and information generating section 150, and may independently correct the position and size of the corresponding image as well as the color and brightness of the same.

As a further modification, the present invention may be applied to an image processing system including a plurality of image projecting sections 190 located at different positions and having an image processing unit which includes the sensing section 140, the information generating section 150 and the like.

In the aforementioned embodiment, the overlap area 60 is detected by summing the luminance values of the projection area calibration images projected by the projectors 20-1 and 20-2 at different points of time. However, the projectors 20-1 and 20-2 may project projection area calibration images at the same time, for example, by adopting a technique of directly detecting the coordinates of the projection and overlap areas when the overlap area 60 is detected without being based on the difference between the luminance values.

If, in such a case, the projection area calibration images are different from each other in color, pattern or the like, the projection area calibration images can easily be identified.

In the aforementioned embodiment, the projector 20 performs the calibration of the color and brightness in the image after the calibration of the projection area has been carried out. As a further modification, however, such a processing may be carried out in the reverse order.

In the aforementioned embodiment, the projector 20 uses the luminance value as a brightness index value. As a further modification, however, any brightness index value other than the luminance value, such as illuminance value or lightness value may be applied to the present invention.

In the aforementioned embodiment, the projection target area is the screen 10. As a further modification, however, it may be a wall or the like. In the aforementioned embodiment, the present invention can be applied to any one of various other kinds of projection target areas by adopting the technique of detecting the four-corner coordinates of the screen 10 based on the luminance distribution, rather than the technique of detecting directly the four-corner coordinates of the screen 10.

In the aforementioned embodiment, the projector 20 is used as an image processing system. However, the present invention is effective for various other kinds of image processing systems such as Cathode Ray Tube (CRT), Light Emitting Diode (LED) rather than the projector 20.

The projector 20 may be either of a liquid crystal projector, a projector using a Digital Micromirror Device (DMD) or the like. By the way, DMD is a trademark possessed by the U.S. Texas Instruments.

The functions of the aforementioned projector 20 may be implemented into a single projector or may be implemented dispersedly into a plurality of processing units (e.g., a projector and a PC).

What is claimed is:

1. An image processing system comprising:
 a plurality of image projection means for projecting images based on image signals so that the images are displayed in a manner to overlap one another on a projection target area, the image projection means being disposed at different positions;
 sensing means for sensing a predetermined image projected by each of the plurality of image projection means and generating sensing information;
 overlap-area detecting means for detecting projection areas, in each of which the predetermined image is displayed, for detecting a temporary overlap area, on which the projection areas overlap one another, and for detecting an overlap area which is within the temporary overlap area, based on the sensing information;
 correction information generating means for generating correction information which indicates information for positions of the projection areas and a position of the overlap area; and
 projection area correction means for correcting image signals, which is inputted into the plurality of image projection means, based on the correction information, so that an image is projected into the overlap area,
 the plurality of image projection means project images only into the overlap area based on the corrected image signals.

2. The image processing system as defined in claim 1,
 wherein the plurality of image projection means project projection area calibration images at different points of time, and
 wherein the overlap-area detecting means determines a peak position that is a brightest position in each of the projection area calibration images that have been sensed, based on the sensing information for the projection area calibration images, and detects the projection areas based on the peak position.

3. The image processing system as defined in claim 2,
 wherein the overlap-area detecting means detects the overlap area by adding a brightness index value of a pixel or a pixel block in each of the projection areas that have been detected.

4. The image processing system as defined in claim 1,
 wherein the overlap-area detecting means detects a rectangular overlap area which is the overlap area, aspect ratio of which has been adjusted, and
 wherein the correction information generating means generates, as the correction information, one of information that indicates positions of four corners in the rectangular overlap area and positions of four corners in each of the projection areas, information that indicates the positions of the four corners in the rectangular overlap area, and information that indicates differential values between the positions of the four corners in the rectangular overlap area and the positions of the four corners in each of the projection areas.

5. The image processing system as defined in claim 1, further comprising:

a color reproduction means for correcting color and brightness in an image based on color reproduction information, in order to reproduce color and brightness of an target image, wherein the plurality of image projection means projects color reproducing calibration images for correcting the color and brightness of an image in a manner to overlap one another into the overlap area, on condition that the image signals are corrected by the projection area correction means and an image is projectable only into the overlap area, wherein the sensing means senses the color reproducing calibration images that have been projected into the overlap area, wherein the correction information generating means generates the color reproduction information based on the sensing information for the color reproducing calibration images, and wherein the color reproduction means corrects the image signals based on the color reproduction information.

6. An image processing system comprising:

a plurality of image projection sections which project images based on image signals so that the images are displayed in a manner to overlap one another on a projection target area, the image projection sections being disposed at different positions;

sensing section which senses a predetermined image projected by each of the image projection sections and generates sensing information;

overlap-area detecting section which detects projection areas, in each of which the predetermined image is displayed, detects a temporary overlap area, on which the projection areas overlap one another, and detects an overlap area which is within the temporary overlap area, based on the sensing information;

correction information generating section which generates correction information which indicates information for positions of the projection areas and a position of the overlap area; and projection area correction section which corrects image signals, which is inputted into the image projection sections, based on the correction information, so that an image is projected into the overlap area, the plurality of image projection sections project images only into the overlap area based on the corrected image signals.

7. A projector comprising:

image projection means for projecting an image based on image signals to display the image in a manner to overlap another image projected from another projector at a projection target area, the image projection means being disposed at a different position from a position in which the other projector is disposed;

sensing means for sensing a predetermined image projected onto the projection target area and generating sensing information;

overlap-area detecting means for detecting projection areas, in each of which the predetermined image is displayed, for detecting a temporary overlap area, on which the projection areas overlap one another, and for detecting an overlap area which is within the temporary overlap area, based on the sensing information;

correction information generating means for generating correction information which indicates information for positions of the projection areas and a position of the overlap area; and projection area correction means for correcting image signals, based on the correction information, to project an image only into the overlap area.

8. A projector comprising:

an image projection section which projects an image based on image signals to display the image in a manner to overlap another image projected from another projector at a projection target area, the image projection section being disposed at a different position from a position in which the other projector is disposed;

sensing section which senses a predetermined image projected onto the projection target area and generates sensing information;

overlap-area detecting section which detects projection areas, in each of which the predetermined image is displayed, detects a temporary overlap area, on which the projection areas overlap one another, and detects an overlap area which is within the temporary overlap area, based on the sensing information;

correction information generating section which generates correction information which indicates information for positions of the projection areas and a position of the overlap area; and projection area correction section which corrects image signals, based on the correction information, to project an image only into the overlap area.

9. A projector comprising:

image projection means for projecting an image based on image signals to display the image in a manner to overlap another image projected from another projector at a projection target area, the image projection means being disposed at a different position from a position in which the other projector is disposed;

sensing means for sensing a predetermined image projected onto the projection target area and generating sensing information;

overlap-area detecting means for detecting projection areas, in each of which the predetermined image is displayed, for detecting a temporary overlap area, on which the projection areas overlap one another, and for detecting an overlap area which is within the temporary overlap area, based on the sensing information;

correction information generating means for generating correction information which indicates information for positions of the projection areas for the projector and the other projector and a position of the overlap area;

projection area correction means for correcting image signals, based on the correction information, to project an image only into the overlap area; and communication means for transmitting the correction information for the other projector to the other projector.

10. A projector comprising:

an image projection section which projects an image based on image signals to display the image in a manner to overlap another image projected from another projector at a projection target area, the image projection section which being disposed at a different position from a position in which the other projector is disposed;

a sensing section which senses a predetermined image projected onto the projection target area and generates sensing information;

an overlap-area detecting section which detects projection areas, in each of which the predetermined image is displayed, detects a temporary overlap area, on which the projection areas overlap one another, and detects an overlap area which is within the temporary overlap area, based on the sensing information;

a correction information generating section which generates correction information which indicates information for positions of the projection areas for the projector and the other projector and a position of the overlap area;

a projection area correction section which corrects image signals, based on the correction information, to project an image only into the overlap area; and a communication section which transmits the correction information for the other projector to the other projector.

11. A computer-readable program for causing a computer to function as:

image projection means for projecting an image based on image signals to display the image in a manner to overlap another image projected from another projector at a projection target area, the image projection means being disposed at a different position from a position in which the other projector is disposed;

sensing means for sensing a predetermined image and generating sensing information;

overlap-area detecting means for detecting projection areas, in each of which the predetermined image is displayed, for detecting a temporary overlap area, on which the projection areas overlap one another, and for detecting an overlap area which is within the temporary overlap area, based on the sensing information;

correction information generating means for generating correction information which indicates information for positions of the projection areas and a position of the overlap area; and projection area correction means for correcting image signals, based on the correction information, to project an image only into the overlap area.

12. An information storage medium which stores a computer-readable program for causing a computer to function as:

image projection means for projecting an image based on image signals to display the image in a manner to overlap another image projected from another projector at a projection target area, the image projection means being disposed at a different position from a position in which the other projector is disposed;

sensing means for sensing a predetermined image and generating sensing information;

overlap-area detecting means for detecting projection areas, in each of which the predetermined image is displayed, for detecting a temporary overlap area, on which the projection areas overlap one another, and for detecting an overlap area which is within the temporary overlap area, based on the sensing information;

correction information generating means for generating correction information which indicates information for positions of the projection areas and a position of the overlap area; and projection area correction means for correcting image signals, based on the correction information, to project an image only into the overlap area.

13. An image processing method for displaying images from a plurality of projectors in a manner that the images overlap one another, the method comprising:

projecting projection area calibration images from the projectors onto a projection target area at different points of time using the projectors, at a time of calibration;

sensing the projection area calibration images projected by the projectors and generating sensing information;

converting sensing information in sensing coordinates into sensing information in projection target area coordinates, based on the sensing information that has been generated;

detecting projection areas, in each of which the projection area calibration image is projected, based on the sensing information that has been converted, detecting a temporary overlap area, on which the projection areas overlap one another, and detecting an overlap area which is within the temporary overlap area, based on the sensing information;

generating correction information which indicates information for positions of the projection areas and a position of the overlap area;

correcting image signals which is inputted into the projectors based on the correction information, so that an image is projected into the overlap area; and projecting images only into the overlap area by the projectors based on the image signals that have been corrected.

14. The image processing method as defined in claim 13, further comprising:

determining a peak position that is a brightest position in each of the projection area calibration images that have been sensed, based on the sensing information for the projection area calibration images, and converting sensing information in sensing coordinates into sensing information in projection target area coordinates, based on the peak position.

15. The image processing method as defined in claim 14, further comprising:

detecting the overlap area by adding a brightness index value of a pixel or a pixel block in each of the projection areas that have been detected.

16. The image processing method as defined in claim 13, further comprising:

detecting a rectangular overlap area which is the overlap area, aspect ratio of which has been adjusted, and generating, as the correction information, one of information that indicates positions of four corners in the rectangular overlap area and positions of four corners in each of the projection areas, information that indicates the positions of the four corners in the rectangular overlap area, and information that indicates differential values between the positions of the four corners in the rectangular overlap area and the positions of the four corners in each of the projection areas.

* * * * *